United States Patent Office 2,955,105
Patented Oct. 4, 1960

2,955,105
PROCESS FOR IMPROVING POLYOLEFINS

Otto Fuchs, Hofheim (Taunus), and Ernst Junghanns, Frankfurt am Main, Germany, assignors to Farbwerke Hoechst Aktiengesellschaft vormals Meister Lucius & Brüning, Frankfurt am Main, Germany, a corporation of Germany No Drawing. Filed Mar. 18, 1957, Ser. No. 646,579

Claims priority, application Germany Mar. 22, 1956

7 Claims. (Cl. 260—88.2)

This invention relates to polyolefins and more particularly to the stabilization of low-pressure polyolefins.

For practical applications, polyolefins have a definite disadvantage of being attacked by atmospheric oxygen at slightly elevated temperatures. The attack becomes evident in a primary decrease of the average molecular weight, followed by cross-linking of the macromolecules with the formation of insoluble products, and partly in the brittleness of the material. As a result, sheets, films, pipes, and the like made of polyolefins become completely brittle after a certain time and hence valueless. The rate at which degradation and brittleness occur increases with increasing temperature. These phenomena begin to appear below 100° C.; however, the rate of increase is very slow. Above 100° C. it increases considerably and a twofold to threefold increase is observed for a 10° rise in temperature. For example, the reduced viscosity, $\eta$ red=$\eta$ spec./c. $\eta$ spec.=specific viscosity measured at 120° C. in tetrahydronaphthalene solutions (concn. 0.5 g./100 cc. of solution stabilized with 0.1% phenyl-$\beta$-naphthylamine) of a sample decreased from an initial 2.90 to 1.75 after 24 hours at 120° C. and to 0.90 after another 24 hours. After three days at 120° C., the sample had become completely insoluble and brittle.

To avoid these disadvantages, a variety of stabilizers were heretofore added in amounts from 0.1% to 3%. However, the use of stabilizers has certain drawbacks. There is one kind of stabilizer which causes discoloration of polyolefins by forming resin-like, colored products when exposed to oxygen. Stabilizers containing phenolic groups belong to this type. Other stabilizers have a characteristic odor and, therefore, present a problem in the processing of polyolefins and in the use of articles prepared therefrom. Stabilizers containing sulfur belong to this group. The use of stabilizers having polar groups results in higher dielectric losses in the stabilized polyolefins than in the unstabilized polyolefins. Furthermore, some stabilizers are toxic and unsuitable for certain applications. The high cost of stabilizers, their insolubility in water, thus requiring the use of organic solvents for homogeneous incorporation of the stabilizers with the polyolefin and subsequent evaporation of said solvent, the exudation of stabilizers when used for longer periods at elevated temperatures are some of the difficulties encountered. Some stabilizers exhibit several of these disadvantages.

It has now been found that degradation and brittleness of polymers or copolymers of olefins prepared by the low-pressure process can be decreased by treating the polymers or copolymers, before or after drying, suitably after removing the catalyst or hardening the suspending agents originating from the preparation, with liquid sulfuric acid containing from 0 to 60% of water at temperatures below 60° C. and subsequently removing the acid by washing with water or a mixture of water and a miscible organic liquid at temperatures below 60° C.

The preparation of polymers or copolymers of olefins by the low-pressure process is described in Belgian Patents 533,362; 534,792 and 534,888. These Belgian patents disclose a catalyst comprising an organo-metallic compound and a compound of a metal selected from subgroups IV—VI of the periodic table.

In the process of the invention, the sulfuric acid is in itself not a stabilizer, for the stabilizing effect persists even after the acid has been practically completely washed out from the polymer. The best results are obtained with sulfuric acid containing the preferred range of about 10 to 30% water; the treatment with concentrated sulfuric acid of 98% concentration or with more dilute acid gives somewhat poorer stabilization results. Aqueous sulfuric acid containing more than 80% water is of no effect.

Just like the range of concentration of sulfuric acid, the pretreatment temperature range should be kept within certain limits. The sulfuric acid is used in the liquid state above its freezing point. The optimum temperature range is 0 to 30° C. Above 60° C. the polyolefin may decompose with the appearance of a brown color when the sulfuric acid contains less than the preferred amount of water. Within the range of 0 to 30° C. the treatment lasts from 2 to 10 minutes, a longer time being required at temperatures below 0° C. Finely powdered material needs shorter treatment than a coarse powder and polypropylene needs to be treated slightly longer than polyethylene. In general, treatments exceeding 10 minutes are unnecessary since they have no influence on the stabilizing effect.

The treatment can be modified in many ways. For example, to obtain good wetting, if the polyolefin is in the form of a dry powder, the latter is agitated for a short while with acid to which is added a water-soluble organic compound as a wetting agent, particularly an alcohol, such as methanol or ethanol, in amounts which depend on the water content of the acid. The higher the concentration of the acid, the lower the amount of the wetting agent. Acids exceeding concentrations of 95% do not need any additives because the wetting action of such acids is fairly good. The water-soluble organic wetting agents can be replaced by surfactants, for example, emulsifiers, provided the emulsifying action is retained also in the presence of the acid (use of nonionic emulsifiers, e.g., fatty acid-polyglycol esters, fatty acid-sorbitol esters, etc.). After the polyolefin has been intimately mixed with the acid and the wetting agent, the bulk of the liquid phase is removed, for example, by suction filtration or centrifugation and the moist polyolefin is then washed with a mixture of water and alcohol until no sulfuric acid can be detected in the filtrate by pH determination or precipitating with a barium chloride solution. The alcohol added during washing increases the wetting. The use of methanol alone has little advantage for washing. In fact, the washing solution should contain at least 30% water.

As far as the temperature for washing out the acid is concerned, the same applies as for the pretreatment temperature. In any case, temperatures above 60° C. should be avoided as long as the polyolefin contains a significant amount of the sulfuric acid. The heat of dilution evolved at the beginning of the washing should be removed with a precooled washing liquid or with large quantities of the washing liquid. To the washing liquid may be added a compound which boils below 60° C. at atmospheric pressure, and which is not completely miscible with water. Exemplary of such compounds are low-boiling petroleum ether and methylene chloride. The heat of dilution evolved is consumed by evaporation. A reflux condenser may be set up to keep the requisite amount of the low-boiling substance to a minimum. Or, the polyolefin containing a significant amount of the acid can be poured, with agitation, into an ice-water mixture which, to prevent premature melting of the ice, contains no organic compounds. The polyolefin is suction-filtered and only then washed with a mixture of methanol and water. The neutral washed product is dried at temperatures between 50° and 100° C. in a drying oven or in a circulating air oven. The polyolefin is then ready for further use.

The pretreatment with sulfuric acid can be carried out also during the work-up of the low pressure polyolefin. Pertinent experiments indicate that the acid treatment exerts a stabilizing effect which is particularly good when the acid is applied at certain stages of the work-up. If polyolefin is prepared in the presence of an aliphatic hydrocarbon, boiling range 200–220° C., the following steps are required to obtain dry polyolefin which is free from catalysts and hydrocarbons. The catalyst is destroyed by adding butyl alcohol, washing with water, filtering, removing the residual hydrocarbon, for example, by steam distillation, and drying the water-wet polyolefin. It has been found that the addition of sulfuric acid is particularly advantageous when the product is free from the catalyst and hydrocarbon; in the foregoing example it is particularly advantageous to add the acid after the steam distillation. If the acid treatment is carried out prior to the work-up, a certain stabilizing effect is obtained but to a lesser degree than after the impurities have been removed.

The acid mixture employed in the pretreatment can be used several times when it is separated by filtration or centrifuging. The same could be applied to the washing liquid except that the acid should be neutralized with sodium hydroxide prior to the use of said liquid. The sodium sulfate forming in the washing liquid interferes only if wetting difficulties arise on account of the salt concentration being too high. In any case, a salt-free washing liquid should be used for the final rinsing.

The objective of pretreating polyolefins in this manner is stabilization and not subsequent purification, for example, removal of residual catalysts. This is proved by the fact that the ash content of the polyolefins (about 0.06–0.1%) is not changed by the treatment with sulfuric acid.

The experiments for determining degradation and brittleness were carried out at 120° C. This temperature is in the vicinity of the melting temperature of low-pressure polyolefins (125–130° C. in the case of polyethylene) and is seldom considered for practical applications. This particular temperature was selected purposely to investigate the changes of the product under extreme conditions and to shorten the experiments. The degradation was determined by measuring the reduced viscosity according to the method indicated. To determine the brittleness, 0.5 mm. thick sheets were prepared from polyolefin samples by compressing the powder under a pressure of 300 atm. gage at 150° C. The sheets were heated to 120° C. and examined daily for brittleness by means of manual bending tests (the sheet was bent about ±30° by hand). Brittle samples break immediately, while those which are not brittle can be bent about 90° before rupturing.

*Example 1*

After a polyethylene sample had been heated for 24 hours at 120° C., the initial reduced viscosity of 2.86 dropped to 1.75. After three days at 120° C. the sample became insoluble and brittle. However, if 100 g. of the same sample was first intimately mixed with 15 cc. of 98% sulfuric acid at 20° C. and then washed at 20° to 25° C. with a mixture containing equivalent parts of methanol and water until the washing liquid was neutral and then dried at 100° C., there was no noticeable drop in viscosity even after 25 days at 120° C. A pressed sheet made of polyethylene pretreated in this manner became brittle only after 28 days at 120° C.

*Example 2*

Another polyethylene sample of reduced viscosity 2.65 exhibited in the untreated state about the same behavior as in Example 1.

One hundred grams of this sample was mixed at 10° C. with a mixture of 25 cc. of water and 75 cc. of 98% sulfuric acid. After some of the aqueous acid was drawn off, the moist product was suspended, with vigorous agitation, into a mixture of about 50 g. of ice and 200 g. of water; the temperature increased to 5° C. The liquid portion was drawn off once more and the washing with a mixture of ethyl alcohol and water in a 2:3 ratio continued until neutral. The final rinsing was carried out with 50 cc. of methanol; the product was dried at 50° C. The reduced viscosity of the sample pretreated in this manner remained practically unchanged (2.60) after 50 days at 120° C. After another ten days the sample became insoluble. The first signs of brittleness appeared after 48 days, but complete brittleness occurred after 53 days.

*Example 3*

The reduced viscosity of a polyethylene sample prepared in an aliphatic hydrocarbon and worked up without the sulfuric acid mentioned above decreased from the initial 3.95 to 1.65 after 48 hours at 120° C. After two more days, the product had become completely insoluble. A sample of the same material but treated with concentrated sulfuric acid (98% $H_2SO_4$) after removing the catalyst but prior to removing the hydrocarbon showed very little improvement. However, when the product containing about 30% of water after removing the hydrocarbon by means of steam distillation, was agitated at 0–5° C. with 98% sulfuric acid in a quantity corresponding to that of the polymer, washed with water and dried, the reduced viscosity dropped only to 3.12 after 32 days at 120° C.

Similar results were obtained with a polyethylene having an initial reduced viscosity of 5.39.

*Example 4*

Polypropylene prepared by the low-pressure process can be stabilized in the same manner. The effect is by far not as great as with polyethylene because polypropylene is much more sensitive to oxygen. For example, the reduced viscosity of a polypropylene sample decreased from 6.02 to 0.07 after 4 days at 120° C.; the product was then very brittle. However, when the polypropylene was pretreated with sulfuric acid as in Example 1, the drop in viscosity was rapid only in the beginning, for example, 0.70 after 4 days and 0.53 after another 4 days.

What is claimed is:

1. In a process of stabilizing an olefin polymer selected from the group consisting of polyethylene, polypropylene and a copolymer of ethylene and propylene, said polymer being prepared by polymerization of the corresponding monomer in the presence of a catalyst comprising an organo metallic compound and a compound of a metal selected from the group consisting of subgroups IV—VI of the periodic table, the steps comprising contacting said polymer with liquid sulfuric acid containing from 0–60% water at a temperature below about 60° C. until the degradation and embrittlement properties of the polymer are improved, and subsequently removing the sulfuric acid and washing the polymer free of water soluble acids with an aqueous solvent at a temperature below 60° C.

2. The process of claim 1 in which the polymer is freed of polymerization catalyst prior to the treatment.

3. The process of claim 1 in which the suspending agent used in the polymerization is removed from the polymer prior to the treatment.

4. The process of claim 1 in which the polymer is freed of polymerization catalyst and dried prior to the treatment.

5. The process of claim 1 in which the aqueous solvent is fresh water.

6. The process of claim 1 in which the aqueous volatile solvent is a mixture of water and a water-miscible alcohol.

7. Process of claim 1 wherein the polyolefin is agitated in powder form with liquid sulfuric acid and a wetting agent.

References Cited in the file of this patent

UNITED STATES PATENTS

| | | |
|---|---|---|
| 2,644,801 | D'Alelio | July 7, 1953 |
| 2,824,089 | Peters et al. | Feb. 18, 1958 |

OTHER REFERENCES

Hahn et al.: Ind. Eng. Chem., vol. 37, pages 526–33 (1945).

Raff et al.: Polyethylene, page 238 (1956), Interscience Publishing Inc., N.Y.